March 19, 1929.   E. WILDHABER   1,705,886
METHOD OF PRODUCING HYPOID GEARS
Filed Feb. 28, 1927   3 Sheets-Sheet 2
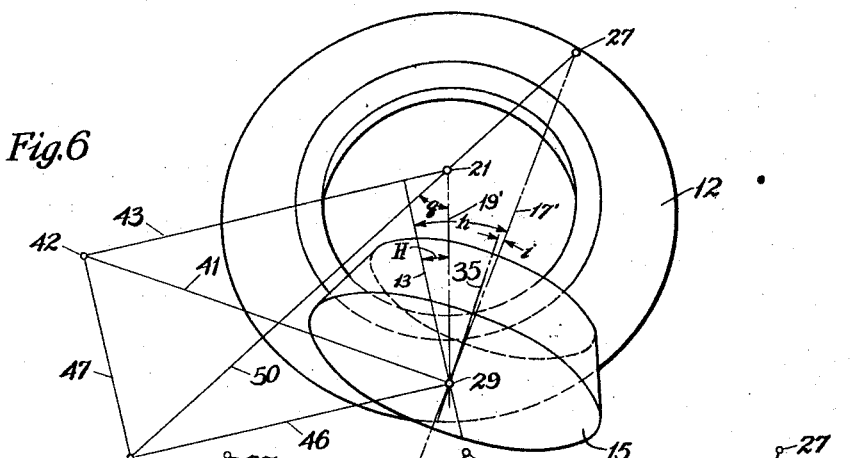
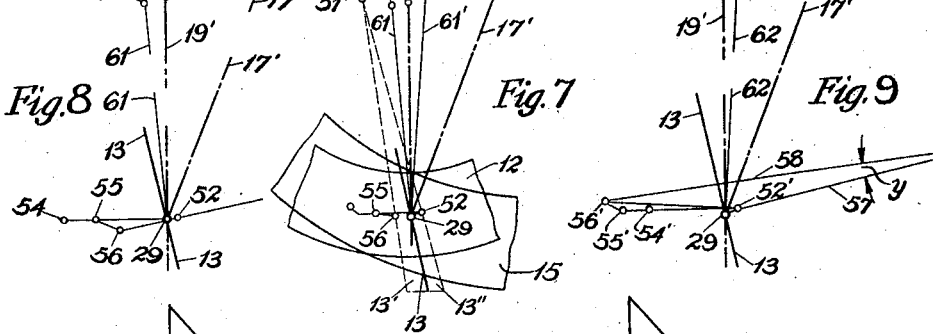
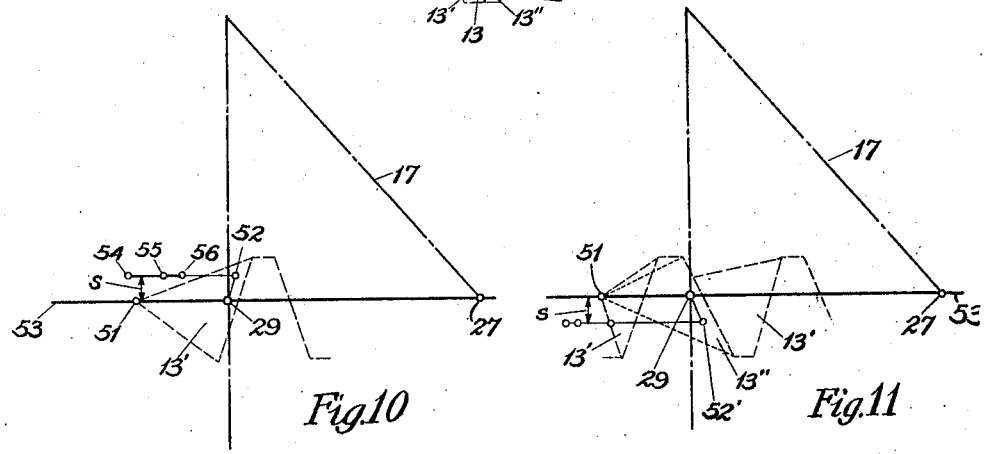
INVENTOR
Ernest Wildhaber
BY
B. W. Schlesinger
ATTORNEY

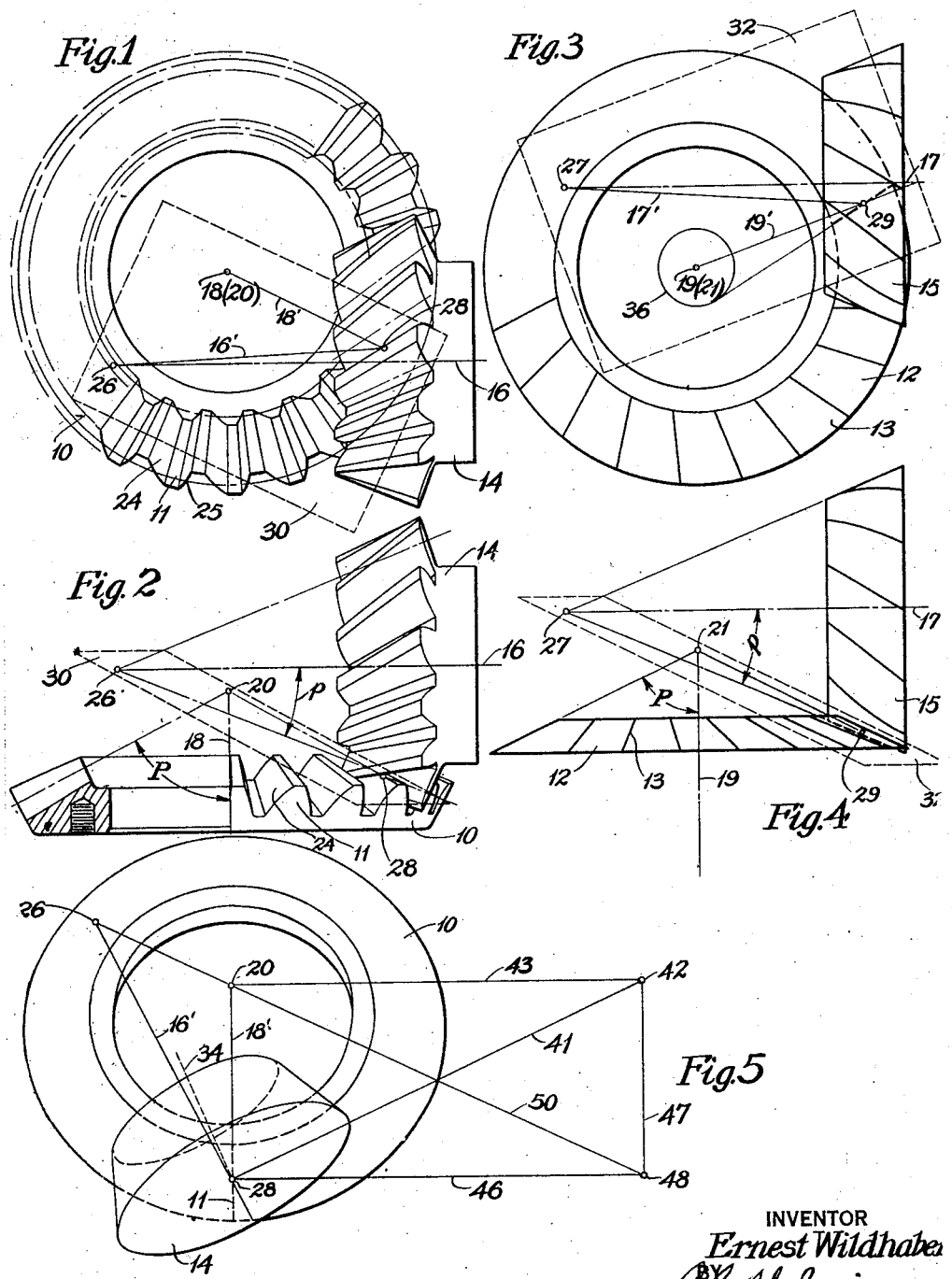

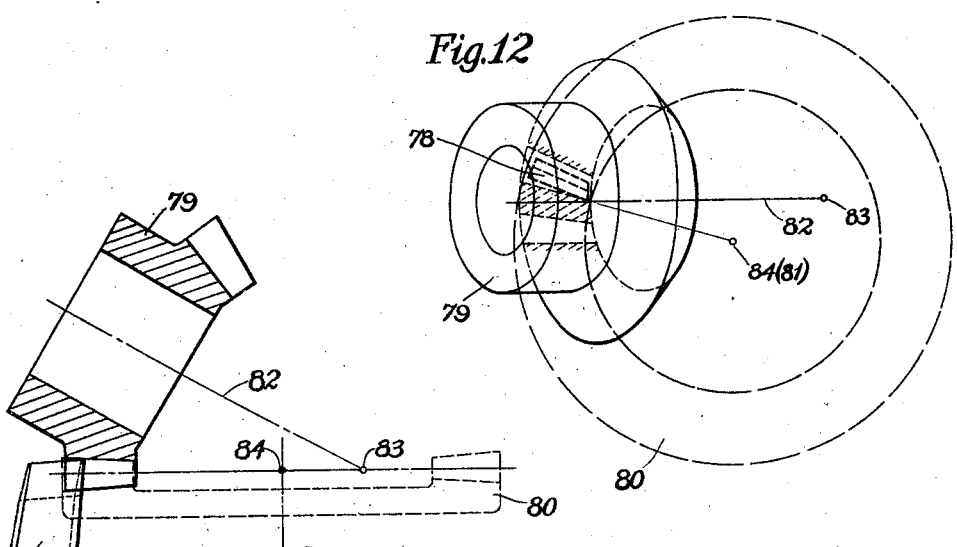
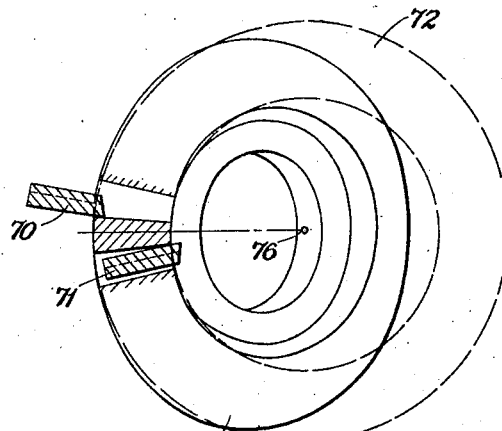
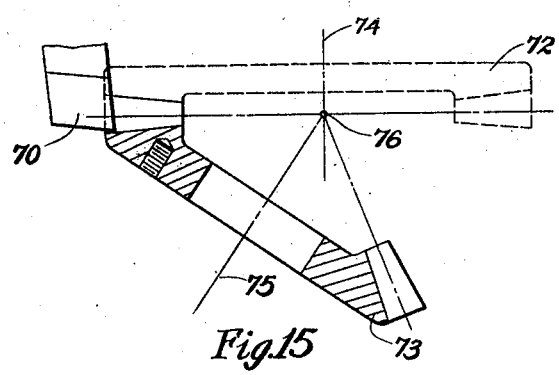

Patented Mar. 19, 1929.

1,705,886

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

METHOD OF PRODUCING HYPOID GEARS.

Application filed February 28, 1927. Serial No. 171,609.

The present invention relates to hypoid gears, or gears which mesh with axes non-intersecting and non-parallel, and to a method of producing such gears. The present invention relates, in particular, to hypoid gears having tooth surfaces such as may be produced by the movement of a planing tool in a straight path across the face of a tapered gear blank.

It is well known that it is possible to obtain a smoother finish on the tooth surfaces of generated gears than can be secured where one or both members of a pair are non-generated.

A primary object of this invention is, therefore, to provide hypoid gears of such character that each member of the pair may be produced in a simple generating operation by the use of planing tools and upon machines already in existence or comparable in their simplicity to the machines ordinarily employed in cutting straight tooth bevel gears.

A further object of this invention is to provide a method for cutting hypoid gear pairs, through which gears may be produced which will run together without "bias bearing" and will transmit true uniform motion.

With the above and other objects in view, the present invention resides in the various novel features peculiar to the new gears and in the various novel steps constituting the new process of producing hypoid gears, the same being described hereinafter in the specification, illustrated in the accompanying drawings, and set forth in the appended claims.

The invention is illustrated in the accompanying drawings, in which:

Figures 1 and 2 are a plan view and side elevation, respectively, of a pair of hypoid gears produced according to one embodiment of my invention;

Figures 3 and 4 are similar views of the pitch surfaces of a pair of hypoid gears produced according to another embodiment of my invention;

Figure 5 is a diagrammatic view of the pair of gears shown in Figures 1 and 2, illustrating the method of proportioning these gears;

Figure 6 is a similar view of the pair shown in Figures 3 and 4;

Figure 7 is a diagrammatic view similar to Figure 6 in which the pitch surfaces of the gears have been omitted for the sake of clearness and in which the relationship between the members of the pair to the basic gears to which they are generated conjugate are more fully disclosed;

Figures 8 and 9 are views on a larger scale, similar to Figure 7 and referring, respectively, to opposite sides of the teeth of the pair;

Figures 10 and 11 are side elevations corresponding to Figures 8 and 9, respectively;

Figures 12 and 13 are a plan view and side elevation, respectively, illustrating the preferred method of producing the pinion or smaller member of the pair according to this invention; and Figures 14 and 15 are similar views illustrating the preferred method of producing the gear or larger member of the pair with this invention.

According to the present invention, the gear or larger member of the pair is produced in the same manner as are ordinary straight tooth bevel gears, that is, it is provided with straight teeth and with tooth surfaces conjugate to a basic crown gear whose axis intersects the axis of the blank in its apex. The pinion or smaller member of the pair, on the other hand, is generated conjugate to a basic crown gear having straight teeth, whose axis is offset from the axis of the pinion blank during the generating operation. The gear, may, accordingly, be cut with a reciprocating planing tool by moving the tool across the face of a tapered gear blank while imparting a relative rolling movement between the tool and blank as though the blank were rolling with a basic crown gear whose axis intersected the blank axis in its apex. The pinion may be cut by reciprocating a planing tool across the face of a tapered gear blank while imparting a relative movement between the tool and blank, as though the blank were meshing with a basic crown gear whose axis is offset from the axis of the blank.

Figures 1 to 4 inclusive show two different embodiments of my invention. The gear 10 of Figures 1 and 2 is provided with straight radial teeth 11, while the gear 12 which is shown more or less diagrammatically in Figures 3 and 4 is provided with straight teeth 13 which are non-radial or skew. The pinions 14 and 15 which mesh with the gears 10 and 12, respectively, are constructed to mesh with these gears with their respective axes 16 and 17 offset from, that is, non-intersecting and non-parallel to, the axes 18 and 19, respectively, of the gears 10 and 12.

The gears 10 and 12 are produced in the same general way as are straight tooth bevel gears having radial or skew teeth, as the case may be. In other words, the gears 10 and 12 are generated conjugate to crown gears or nominal crown gears, whose axes intersect the axes of the gear blank in their respective apexes 20 and 21. It is to be noted, however, that preferably the two sides of the teeth of the mating gears, as, for instance, the two sides 24 and 25 of the teeth 11 of the gear 10, are cut with different pressure angles. The side 24 is provided with the larger pressure angle, for, generally, that side of the gear tooth is provided with the larger pressure angle which faces the pinion apex when the gears are in mesh. Different pressure angles are desirable on the two tooth sides of the teeth of hypoid gears because, if the pressure angles are equal, the mating tooth profiles will be more curved on one side than on the other and hence more subject to undercut on one side. The provision of the larger pressure angle on one side prevents undercutting. The use of different pressure angles on the two sides of the teeth is a feature of hypoid gears not to be found in bevel or spur gears.

The pinions 14 and 15 which are to mate with the gears 10 and 12 respectively, are produced in such way that they will transmit true uniform motion when in mesh with their respective gears and will mesh preferably without bias bearing. The method of producing the pinions will be explained more in detail hereinafter.

The pitch surfaces of the gears and pinions are conical surfaces, the gears having their pitch cone apexes at 20 and 21, respectively, and the pinions having their pitch cone apexes at 26 and 27, respectively. The pair of gears 10 and 14 are, preferably, constructed so that their pitch cones contact with each other at a point 28 which is located midway of the face of the gears, while the gears 12 and 15 are also, preferably, constructed that their pitch cones contact in a similar point 29 midway of their faces.

Figure 5 is a diagrammatic view of the pair shown in Figs. 1 and 2, in which the plane of the drawing is that of the plane 30 which is tangent to the pitch surfaces of gear 10 and pinion 14 at the mean contact point 28. The axes of the gear and pinion project into this plane 30 as lines 18' and 16' respectively. Similarly, Fig. 6 is a diagrammatic view of the gears shown in Figs. 3 and 4, in which the plane of the drawing is that of the plane 32 tangent to the pitch surfaces of gear 12 and pinion 15 at the mean contact point 29. The axes of the gear and pinion, respectively, project into this plane as the lines 19' and 17' respectively.

The present invention is accurately applicable to the production of hypoid gears, whatever relation the cone angles or pitch angles $p$ and $P$ of pinion and gear, respectively, have to each other and to the gear ratio. Preferably, however, gears constructed according to this invention will be proportioned according to the principles disclosed in my copending application, Serial No. 165,858, filed February 4, 1927. In other words, the mating gears of the pair will preferably be so proportioned as to mesh along a line, as the line 34 in Figure 5, or the line 35 in Figure 6 which lies between the projected gear and pinion axes.

As the principles underlying this method of proportioning the gears are the same, whether the larger member of the pair has straight radial teeth, as the gear 10, or non-radial teeth, as the gear 12, the method of determining the proportion of one of these pairs, only, will be described in detail here. The more general case is that of pairs in which the larger member has non-radial or skew teeth. In the case of such gears, the teeth are tangent to a circle, as the circle 36, Figure 3, circumscribed about the gear apex as a center and having a substantial radius. A gear which has radial teeth can be considered as the gear having teeth tangent to a circle of zero radius. Reference will be had, therefore, in the following description, more particularly to Figure 6, similar reference characters being used, however, to indicate similar parts in Figs. 5 and 6.

As explained, the gear pairs are preferably so proportioned as to mesh in development along a line 34 or 35 which lies between the projected gear and pinion axes. The inclination angle $i$ of this line of action to the projection 17' of the pinion axis may be determined as follows:

$$\cotan i = \cotan (h-H) + \frac{N \cos p}{n \cos P \sin (h-H)}$$

where $h$ is the spiral angle or inclination angle of the pinion teeth, $H$ the spiral or inclination angle of the gear teeth, $N$ and $n$ the tooth numbers of gear and pinion, respectively, and $P$ and $p$, the pitch cone angles of gear and pinion respectively. This formula is the same as that given in my prior application above mentioned, considering simply the difference in hand between the gear pairs shown in the present and the prior application.

The angle between the projected pinion and gear axes 19' and 17' is assumed. We can then determine, for instance, the location of the pinion apex 27. Draw the line 43 through the gear apex 21 perpendicular to the line 13 indicating the direction of the gear tooth. Determine the intersection point 42 of this line with the line 41 which is drawn through the mean contact point 29 perpendicular to the line of action 35. Draw the line 47 through the point 42 parallel to the direction 13 of the tooth and draw the line 46 through the mean contact point 29 perpendicular to the tooth 13. Then the line 50 which connects the intersection point 48 of the lines 47 and 46 with the gear apex 21 will intersect the projection 17' of the pinion axis in the pinion apex 27.

From the construction described, it follows that in the triangle 29—21—27 (Fig. 6) the angle 21—29—27 equals $(h-H)$, and that angle 29—21—27 can be determined as follows: For convenience, let this angle 29—21—27 equal $180° - q$. Then:

$$\cotan q = \tan H + \frac{\tan (h-i)}{\cos^2 H}$$

Angle 21—27—29, on the other hand, is equal to $q - (h-H)$.

Hence, if $A_1$ is equal to the cone distance of the gear, the distance 21—29 and $A_2$ is equal to the cone distance of the pinion, the distance 27—29, then:

$$\frac{A_1}{A_2} = \frac{\sin [q - (h-H)]}{\sin q} = \cos (h-H) - \cotan q \sin (h-H)$$

or $$\frac{A_1}{A_2} = \cos (h-H) - \sin (h-H) \left\{ \tan H + \frac{\tan (h-1)}{\cos^2 H} \right\}.$$

Preferably a gear pair constructed according to this invention is so proportioned as to fulfill the last equation. In addition, the following relation should be fulfilled:

$$\frac{A_1}{A_2} = \frac{N}{n} \frac{\sin p}{\sin P} \frac{\cos h}{\cos H},$$

or in other words, the gears are so constructed that moments exerted upon gear and pinion by a force acting at a mean point of contact 29 normal to the contacting tooth surfaces of the pair are in the proportion of the respective numbers of teeth of the two gears.

In the gear pair illustrated in Figures 1, 2 and 5, the spiral angle or inclination angle of the gear teeth is zero, hence:

$$\frac{A_1}{A_2} = \frac{\cos (2h-i)}{\cos (h-i)}$$

and $$\frac{A_1}{A_2} = \frac{N}{n} \frac{\sin P}{\sin P} \cos h$$

The gear or larger member of the pair is preferably generated like a bevel gear, as already mentioned, and preferably cut two sides simultaneously with a pair of planing tools. Its tooth surfaces, hence will be conjugate to the basic gear, represented by the tools, whose axis will intersect the axis of the gear blank in the gear apex. The principles underlying the production of the pinion will now be described.

Reference is made particularly to Figures 7 to 11. Figure 7 is a diagrammatic view illustrating further relationships between the gear and pinion and the respective gears to which they are generated conjugate. Figures 8 and 9 are views on a larger scale illustrating further certain relationships shown in Figure 7 and referring in one case to one tooth side of the gear teeth and in the other case to the other tooth side of the gear teeth.

Figures 10 and 11 are end elevations corresponding respectively to Figures 8 and 9.

In determining the form of the basic gear to which the pinion is to be generated conjugate, two objects are aimed at, first to generate the pinion so that when in mesh with its gear the two will transmit true uniform motion, and second, so that "bias bearing" between the contacting tooth surfaces will be avoided, bias bearing being that form of tooth bearing in which the contact between mating tooth surfaces extends diagonally across the surfaces of the teeth. Bias bearing can be avoided by so constructing the pinion that when in mesh with its mate gear, contact between mating tooth surfaces of the pair will extend straight up the sides of the mating tooth profiles substantially from the bottom to the top thereof. This form of tooth bearing can be obtained when the pinion is so generated that its normal profile in a median plane, that is, in a plane passing through the point 29 comes into actual contact with the mating normal profile of the gear. This form of tooth bearing can be obtained when the pinion is generated from an offset crown gear, that is, from a crown gear whose axis is non-intersecting and non-parallel to the pinion axis, as will be demonstrated below. Usually, it has been found preferable to cut the tooth sides of the pinion one side at a time and generate these sides conjugate to different basic gears or different crown gears.

One side tooth surface of the basic crown gears is designated 13' and 13" designates the opposite side tooth surface of the basic crown gears. 51 designates the point of convergence of the tooth sides. 29 is of course a point of contact between the gear and crown gear. To avoid bias bearing, the tooth contact should extend straight up the sides of the teeth. Let us consider, therefore, a point 52 on the tooth of the crown gear which lies above or below the point 29 and is situated in the median plane, that is, in the plane which passes through the point 29 and is perpendicular to the tooth 13 of the gear. Figures 8 and 10 refer to a point 52 which is located above the pitch plane 53 of the crown gear, while Figures 9 and 11 refer to a similar point which is situated below the pitch plane 53. In what follows, the same considerations apply to the point 52 situated above the plane of the crown gear as to the point 52′ situated below that plane and for convenience we will consider the positions assumed by one of these points only, designating the corresponding positions assumed by the other points by the same reference numerals primed.

The axis of the crown gear from which the gear is generated is perpendicular to the pitch plane 53 and passes through the apex 21 of the gear. The position where the point 52 becomes a point of contact between the gear and crown gear can be readily determined, therefore, by turning the point 52 about the axis of the crown gear, until the tooth normal intersects the line 19′. The position where the point 52 becomes a point of contact between gear and crown gear is indicated at 54.

For convenience, infinitesimal distances only are considered. Hence the circular arc about the center 21 through which the point 52 moves to the point 54 appears as a straight line perpendicular to the projected gear axis 19′.

When the point 52 has reached the position 54, it is a point of contact between the gear and crown gear, that is, a common or joint point of gear and crown gear. The point 52 on the tooth surface of the gear will ordinarily not make contact with the mating pinion at the same position 54. On the contrary, the point 54 will have to be turned about the axis of the gear into a position such as the position 55 before it becomes a point of contact between the gear and pinion. The line 54—55 again appears as a straight line because infinitesimal distances are considered. Let $s$ equal the distance of the points 52 or 52′, as the case may be, above or below the mean contact point 29. Let the distance 54—55 be $x$. $x$ will be minus when plotted as in Figures 8 and 10 and plus when plotted as in Figures 9 and 11. $x$ can be determined as follows:

The moment exerted upon the gear by a force extending in the direction of the tooth normal at the point 54 is readily determined. It equals the moment exerted by the same force at 54 or at 52 on the crown gear, to which the gear is conjugate, multiplied by the ratio of the respective tooth numbers of the gear and crown gear. Now when the point 54 is turned about the axis of the gear, the moment exerted upon the gear naturally remains constant. But the moment exerted upon the pinon changes. Hence, the point 54 of the gear must be turned about the gear axis until the moment exerted on the pinion by the same normal force equals the moment exerted on the gear multiplied by the ratio $\frac{n}{N}$ of the tooth numbers of pinion and gear. The position 55 where this proportion of moments is found can hence be determined.

Now when the point 54 is turned about the axis of the gear to the position 55 the inclination of the tooth normal to the pitch plane 53, that is, the pressure angle changes. At 55 this inclination or pressure angle is therefore, different from the pressure angle of the tool or crown gear used in producing the gear. Hence, the point 55 cannot be a point of contact between the pinion and its generating crown gear. If it were, the presure angle of the tool, that is, the pressure angle of the crown gear from which the gear is generated, would be transmitted to the pinion at the point 55, whereas, according to the above, point 55 should have a different pressure angle from that of the tool or basic crown gear. To generate the point 55 on the pinion, therefore, it must be turned about the axis of the pinion to a position where the inclination of the tooth normal to the pitch plane 53 will equal the pressure angle of the tool. Such a position is indicated at 56. Point 56 is, therefore, a point of contact between the pinion and its generating crown gear and can be computed from the principles set forth above with the known means of mathematics.

In the case illustrated, the moment exerted upon the crown gear to which the gear is generated conjugate, is the same at the points 29, 52 and 54. The moments exerted upon the gear at the point 29, 54 and 55, are, therefore, also equal and further the moments exerted on the pinion at the points 29, 55 and 56 are also equal. Hence, the moment exerted upon the crown gear to which the pinion is generated conjugate at the point 29 is equal to the moment exerted at 56 and also to that exerted at 52. The basic crown gear, to which the pinion is to be generated conjugate, should be positioned, therefore, so that the point 52 of the crown gear moves to the point 56 during the generation and that when the point 52 has moved to the point 56, the projection of the tooth normal 57 at the point 29 will have moved to the known position 58 (Figure 9).

From the information derived as above, the cone distance $A_3$ of the basic crown gear, from which the pinion is to be generated, can be determined. Different crown gears will be, preferably, employed for the opposite sides of the pinion teeth and these teeth will be cut one side at a time. To find the centers 59 and 60 of the crown gears from which the tooth surfaces of the pinions are to be generated, the distance $A_3$ is plotted on the line 61 or 61′ passing through the point 29 and perpendicular to the line 52—56 or 52′—56′, as the case may be, depending upon the tooth side of the pinion to be generated.

The description given thus far will enable those skilled in the art to determine the proportions and form of the basic generating gears used in producing gears according to this invention and to practise the invention. The principles from which the construction of gears according to this invention are based have led to the determination of certain formulas which eliminate the necessity of making each of the steps described above in order to determine the necessary data as to the proportions of the gears and the form of the basic crown gears from which they are to be generated and these formulas are given below: Let the angle between the projected tooth normals 57 and 58 be $y$ and $a$ the normal pressure angle and let the angle 56—52—54 equal $m$. Then we have:

$$(1) \quad x \sin a \cos a = \frac{-\cos H \frac{\tan p}{A_1}(A_2 \sin h - A_1 \sin H) \mp \tan a \sin (h-H) \sin H}{\frac{\tan p}{A_1}(A_2 \sin h - A_1 \sin H) \pm \tan a \left\{\cos(h-H) + \frac{A_2 \tan p}{A_1 \tan P} \cos (h-H)\right\}}$$

The angle $m$ is positive for one side of the tooth, as in Figure 9, and negative for the other side of the tooth as in Figure 8. The angle $m$ can be determined as follows:

$$(2) \quad \cotan m = \left[\frac{\cos H}{x \sin a \cos a} + 1\right] \frac{A_1 \tan P}{A_2 \tan p} \frac{\cos h}{\cos H} \frac{1}{\sin (h-H)} + \cotan (h-H).$$

The tooth inclination or spiral angle $H_c$ of the crown gear from which the pinion is generated can be determined as follows; $H_c$ is equal to $H + m$. (3). Now:

$$(4) \quad \frac{y}{s} = \frac{1}{A_1}\left[\frac{\cos H}{\sin a \cos a} + x\left\{\left(1 + \frac{\tan p}{\tan P}\frac{\cos H}{\cos h}\right) \mp \frac{\tan a}{\tan P} \sin H\left(\frac{\tan h}{\tan H} - 1\right)\right\}\right].$$

The cone distance $A_3$ of the basic crown gear from which the pinion is to be generated can then be determined as:

$$(5) \quad A_3 = \frac{\left(\frac{\cos H}{\sin a \cos a} + x\right)}{\frac{y}{s}} \frac{\sin (h-H)}{\sin [(h-H) - m]}.$$

The Equations 1 to 5 give all the data necessary for the determination of the relationship between the two gears to be produced and their crown gears.

The method of cutting the gear and the pinion will be clear from what is shown before, but further reference may be had to Figures 12 to 15 inclusive in which the method of cutting the members of a pair constructed according to this invention is more completely illustrated.

Figures 14 and 15 show the preferred method of producing the gear, which will be cut, preferably, upon a two tool generator. The tools 70 and 71 which represent two sides of a basic gear, as the basic crown gear 72, are reciprocated across the face of the gear blank 73, while simultaneously a relative rolling movement is imparted between the tools and blank as though the blank were rolling upon the basic crown gear 72, whose axis 74 intersects the axis 75 of the blank in the gear apex 76. In this rolling motion, the blank is preferably rotated on its axis 75, while simultaneously the tool and blank are moved relatively to each other about an axis 74 representing the axis of the basic gear 72.

Where a gear, as the gear 10, of Figures 1 and 2 is to be produced with teeth which extend radially of its axis, the tools 70 and 71 will move in straight paths extending radially of the gear apex. Where the gear is to be provided with non-radial or skew teeth, as the gear 12, Figures 3 and 4, then the tools will move in paths which are non-radial of the gear apex and tangent to a circle 36, circumscribed about the gear apex and having a radius determined by the amount of skew of the teeth, as indicated in Figure 3.

The pinion, is, as already stated, preferably cut one side at a time and conjugate to an offset basic gear. Thus, in cutting the pinion, the tool, such as the tool 78, is reciprocated across the face of the pinion blank 79 while simultaneously an additional relative movement is imparted between the tool and blank as though the blank were meshing with a basic gear, as the crown gear 80, whose axis 81 is offset from the axis 82 of the pinion blank.

This additional relative movement is effected, preferably, by rotating the blank on its axis 82 and by simultaneously imparting an additional relative movement between the tool and blank about an axis 81 representing the axis of the basic gear 80.

Preferably, the pinion blank is so positioned that its apex 83 lies beyond the apex or center 84 of the basic crown gear, that is, lies beyond the projection of the center of the basic crown gear to the pinion axis. The tool 78 represents a tooth surface of the basic gear 80 whose teeth are radial or non-radial, depending upon the spiral angle to be produced upon the pinion so as to make its teeth suitable for mesh with the teeth of its mate gear. The opposite sides of the teeth of the pinion will be cut, preferably, from a differently offset crown gear, as already described. The amount of offset of the crown gears and their tooth characteristics will be determined as described above. In the cases illustrated, both the gear and pinion blanks are indexed after the two tooth faces or one tooth face, respectively, has been completed. The tools or tool and blank are then returned into engagement and a new tooth or tooth face cut. It is to be understood, however, that the present invention is applicable, also, where the teeth are cut in a continuously indexing operation, where the blank rotates continuously on its axis and the tools operate upon new tooth faces of the blank on each stroke. In this latter case, the crown gears will, of course, have spiral teeth. The principles underlying the present invention are applicable, also to the production of gears having longitudinally curved teeth, where the tooth curvature is produced by the movement of a tool in a curved path across the face of the blank.

The present invention is not restricted to the use of tools having straight profiles as the tools may be of any suitable profile representing correspondingly profiled tooth surfaces of basic gears to which the gear and pinion are to be generated conjugate.

The present invention is not restricted to the use of planing tools in cutting the gears, but tools of any suitable nature may be employed instead.

In general, while I have illustrated and described certain preferred embodiments of my invention, it will be understood that the invention is capable of further modification within its scope and the limits of the appended claims and that this application is intended to cover any variations, uses or adaptations of my invention, following, in general, the principles of the invention and including such departures from the present disclosure as come within known or customary practise in the gear art and as may be applied to the essential features hereinbefore set forth and as fall within the limits of the accompanying claims.

Having thus described my invention, what I claim is:

1. The method of producing a pair of hypoid gears which consists in generating the side tooth surfaces of one member of the pair by moving a tool in a straight path across the face of a tapered gear blank while rotating the blank on its axis and simultaneously imparting an additional relative movement between the tool and blank about an axis intersecting the axis of the blank, and in generating the side tooth surfaces of the other member of the pair by moving a tool in a straight line across the face of a tapered gear blank while rotating the blank on its axis and simultaneously producing an additional relative movement between the latter tool and blank about an axis offset from the axis of the blank.

2. The method of producing a pair of hypoid gears which consists in generating the side tooth surfaces of one member of the pair by moving a tool in a straight path across the face of a tapered gear blank while imparting a relative rolling movement between the tool and blank corresponding to that of a gear meshing with a crown gear whose axis intersects the blank axis, and in cutting the side tooth surfaces of the other member of the pair by moving a tool in a straight path across the face of a tapered gear blank while imparting a relative movement between the latter tool and blank corresponding to that of a gear meshing with a crown gear whose axis is offset from the axis of the blank.

3. The method of producing a pair of hypoid gears which consists in generating the side tooth surfaces of one member of the pair by moving a tool in a straight path across the face of a tapered gear blank while rotating the blank on its axis and simultaneously imparting an additional relative movement between the tool and blank about an axis intersecting the axis of the blank in its apex, and in generating the side tooth surfaces of the other member of the pair by moving a tool in a straight path across the face of a tapered gear blank while rotating the blank on its axis and simultaneously producing an additional relative movement between the latter tool and blank about an axis offset from the axis of the blank.

4. The method of producing a pair of hypoid gears which consists in generating the side tooth surfaces of one member of the pair by moving a tool in a straight path across the face of a tapered gear blank while imparting a relative rolling movement between the tool and blank corresponding to that of a gear meshing with a crown gear whose axis intersects the axis of the blank in its apex, and in generating the side tooth surfaces of the other member of the pair by moving a tool in a straight path across the face of a tapered gear blank while imparting a relative movement between the latter tool and blank corresponding to that of a gear meshing with a crown gear whose axis is offset from the axis of the blank.

5. The method of producing a pair of hypoid gears which consists in cutting the side tooth surfaces of one member of the pair by moving a tool in a straight radial path across the face of a tapered gear blank while imparting a relative rolling motion between the tool and blank corresponding to that of a gear meshing with a crown gear whose axis intersects the axis of the blank in its apex, and in cutting the tooth surfaces of the other member of the pair by moving a tool in a straight line across the face of a tapered gear blank while imparting a relative movement between the tool and blank in the manner of a gear meshing with a basic gear whose axis is offset from the axis of the blank.

6. The method of producing a pair of hypoid gears which consists in cutting the side tooth surfaces of one member of the pair by moving a tool in a straight radial line across the face of a tapered gear blank while rotating the blank on its axis and simultaneously producing an additional relative movement between the tool and blank about an axis which intersects the axis of the blank in the blank apex, and in cutting the side tooth surfaces of the other member of the pair by moving a tool in a straight line across the face of a tapered gear blank while rotating the blank on its axis and simultaneously imparting an additional relative movement between the latter tool and blank about an axis which is offset from the axis of the blank.

7. The method of producing a pair of hypoid gears which consists in cutting the side tooth surfaces of one member of the pair by moving a tool in a straight radial line across the face of a tapered gear blank while imparting a relative rolling motion between the tool and blank corresponding to that of a gear meshing with a crown gear whose axis intersects the axis of the blank in its apex, and in cutting the side tooth surfaces of the other member of the pair by moving a tool in a straight line across the face of a tapered gear blank while imparting a relative movement between the latter tool and blank corresponding to that of a gear meshing with a crown gear whose axis intersects the straight line path of movement of the latter tool and is offset from the axis of the latter blank.

8. The method of producing a pair of hypoid gears which consists in cutting the side tooth surfaces of one member of the pair by moving a tool in a straight radial line across the face of a tapered gear blank while rotating the blank on its axis and simultaneously imparting an additional relative movement between the tool and blank about an axis which intersects the axis of the blank in its apex, and in cutting the side tooth surfaces of the other member of the pair by moving a tool in a straight line across the face of a tapered gear blank while rotating the blank on its axis and simultaneously producing an additional relative movement between the latter tool and blank about an axis which intersects the straight line path of movement of the latter tool and which is offset from the axis of the latter blank.

9. The method of producing a pair of hypoid gears which consists in cutting the side tooth surfaces of one member of the pair two sides simultaneously by moving a pair of planing tools in straight converging paths across the face of a tapered gear blank, while rotating the blank on its axis and simultaneously imparting an additional relative movement between the tool and blank about an axis which passes through the point of convergence of the tool paths and intersects the blank axis in its apex, and in cutting the side tooth surfaces of the other member of the pair one side at a time by moving a tool in a straight path across the face of a tapered gear blank while rotating the blank on its axis and simultaneously moving the latter tool and blank relatively to each other about an axis offset from the blank axis.

10. The method of producing a pair of hypoid gears which consists in cutting the side tooth surfaces of one member of the pair two sides simultaneously by moving a pair of tools in straight converging paths across the face of a tapered gear blank, while imparting a relative rolling movement between the tools and blank corresponding to that of a gear meshing with a crown gear whose axis passes through the point of convergance of the tool paths and intersects the blank axis in its apex, and in cutting the side tooth surfaces of the other member of the pair one side at a time by moving a tool in a straight path across the face of a tapered gear blank while imparting a relative movement between the tool and blank corresponding to that of a gear meshing with a crown gear whose axis is offset from the axis of the blank.

11. The method of producing a pair of hypoid gears which consists in cutting the side tooth surfaces of one member of the pair two sides simultaneously by moving a pair of tools in straight converging paths across the face of a tapered gear blank while imparting a relative rolling movement between the tools and blank in the manner of a gear meshing with a crown gear whose axis passes through the point of convergence of the tool paths and intersects the blank axis in its apex, and in cutting the side tooth surfaces of the other member of the pair one side at a time by moving a tool in a straight path across the face of a tapered gear blank while imparting a relative movement between the latter tool and blank in the manner of a gear meshing with a crown gear whose axis intersects the path of movement of the latter tool and is offset from the blank axis.

12. The method of producing a pair of hypoid gears which consists in cutting the side tooth surfaces of one member of the pair two sides simultaneously by moving a pair of tools in straight converging paths across the face of a tapered gear blank while imparting a relative movement between the tools and blank in the manner of a gear meshing with a crown gear whose axis intersects the blank axis in its apex, and in cutting the side tooth surfaces of the other member of the pair one side at a time by moving a tool in a straight path across the face of a tapered gear blank while imparting an additional movement between the latter tool and blank in the manner of a gear meshing with a crown gear whose axis is offset from the axis of the latter blank.

13. The method of producing a pair of hypoid gears which consists in cutting the side tooth surfaces of one member of the pair two sides simultaneously by moving a pair of tools in straight converging paths across the face of a tapered gear blank while rotating the blank on its axis and simultaneously moving the tools and blank relatively to each other in the manner of a gear meshing with a crown gear whose axis intersects the blank axis in its apex, and in cutting the side tooth surfaces of the other member of the pair one side at a time by moving a tool in a straight path across the face of a tapered gear blank while imparting a relative movement between the latter tool and blank in the manner of a gear meshing with a crown gear whose axis is offset from the axis of the latter blank, opposite sides of the teeth of the latter member of the pair being cut from different offset crown gears.

14. The method of producing a pair of hypoid gears which consists in cutting the side tooth surfaces of one member of the pair two sides simultaneously by moving a pair of tools in straight converging paths across the face of a tapered gear blank while imparting an additional relative movement between the tools and blank in the manner of a gear meshing with a crown gear whose axis intersects the blank axis in its apex, and in cutting the side tooth surfaces of the other member of the pair one side at a time by moving a tool in a straight path across the face of a tapered gear blank while imparting an additional relative movement between the latter tool and blank in the manner of a gear meshing with a crown gear whose axis is offset from the axis of the blank, opposite sides of the teeth of the latter member of the pair being cut from different crown gears whose axes are offset different amounts from the blank axis.

15. The method of producing a pair of hypoid gears which consists in cutting the side tooth surfaces of one member of the pair two sides simultaneously by moving a pair of tools in straight converging paths across the face of a tapered gear blank while imparting an additional relative movement between the tools and blank in the manner of a gear meshing with a crown gear whose axis passes through the point of convergence of the tool paths and intersects the blank axis in its apex, and in cutting the side tooth surfaces of the other member of the pair one side at a time by moving a tool in a straight path across the face of a tapered gear blank while imparting an additional relative movement between the latter tool and blank in the manner of a gear meshing with a crown gear whose axis intersects the straight line path of movement of the latter tool and is offset from the axis of the latter blank, opposite sides of the teeth of the latter member of the pair being cut from different crown gears whose axes are offset different amounts from the blank axis.

16. The method of producing a pair of hypoid gears which consists in cutting the side tooth surfaces of one member of the pair two sides simultaneously by moving a pair of tools in straight converging paths across the face of a tapered gear blank while rotating the blank on its axis and simultaneously producing an additional relative movement between the tools and blank about an axis intersecting the axis of the blank in its apex, and in cutting the side tooth surfaces of the other member of the pair, one side at a time, by moving a tool in a straight path across the face of a tapered gear blank while rotating the blank on its axis and simultaneously producing an additional relative movement between the latter tool and blank about an axis offset from the blank axis, said axis being offset different amounts from the blank axis in cutting opposite sides of the teeth of the latter member of the pair.

17. The method of producing a pair of hypoid gears which consists in cutting the side tooth surfaces of one member of the pair two sides simultaneously by moving a pair of tools in straight converging paths across the face of a tapered gear blank while rotating the blank on its axis and simultaneously producing an additional relative movement between the tools and blank about an axis passing through the point of convergence of the tool paths and intersecting the blank axis in its apex, and in cutting the side tooth surfaces of the other member of the pair one side at a time, by moving a tool in a straight path across the face of a tapered gear blank while rotating the blank on its axis and simultaneously producing an additional relative movement between the latter tool and blank about an axis offset from the blank axis and intersecting the path of movement of the latter tool, said axis being offset different amounts from the blank axis in cutting opposite sides of the teeth of the latter member of the pair.

18. The method of producing a hypoid gear which consists in cutting one side of its teeth by moving a tool in a straight path across the face of a tapered gear blank while imparting a relative movement between the tool and blank corresponding to that of a gear meshing with a crown gear whose axis is offset from the axis of the blank, and in cutting the opposite sides of its teeth by moving a tool in a straight path across the face of the blank while imparting an additional relative movement between the latter tool and the blank corresponding to that of a gear meshing with a crown gear, different from the first crown gear, whose axis is also offset from the axis of the blank.

19. The method of producing a hypoid gear which consists in cutting one side of its teeth by moving a tool in a straight path across the face of a tapered gear blank while rotating the blank on its axis and simultaneously moving the tool and blank relatively to each other about an axis offset from the axis of the blank, and in cutting the opposite sides of its teeth by moving a tool in a straight path across the face of the blank while rotating the blank on its axis and simultaneously producing an additional relative movement between the latter tool and the blank about an axis other than the axis about which the first named relative movement takes place.

20. The method of producing a hypoid gear which consists in cutting one side of its teeth by moving a tool in a straight path across the face of a tapered gear blank while rotating the blank on its axis and simultaneously producing an additional relative movement between the tool and blank about an axis offset from the blank axis, and in cutting the opposite sides of its teeth by moving a tool in a straight path across the face of the blank while rotating the blank on its axis and simultaneously producing an additional relative movement between the tool and blank about an axis offset from the blank axis a greater distance than the first named offset axis.

21. The method of producing a hypoid gear which consists in cutting its side tooth surfaces by moving a tool in a straight path across the face of a tapered gear blank while rotating the blank on its axis and simultaneously producing an additional relative movement between the tool and blank about an axis which intersects the tool path and is offset from the blank axis, said axis being offset different amounts from the blank axis in cutting opposite sides of the teeth of the blank.

22. The method of producing a hypoid gear which consists in cutting its side tooth surfaces one side at a time by moving a tool in a straight path across the face of a tapered gear blank, while imparting a relative movement between the tool and blank in the manner of a gear meshing with a crown gear whose axis intersects the tool path and is offset from the axis of the blank, said axis being offset different amounts from the blank axis in the cutting of the opposite sides of the teeth of the blank.

23. The method of producing a pair of hypoid gears which consists in cutting the side tooth surfaces of one member of the pair by moving a tool in a straight path across the face of a tapered gear blank while producing a relative rolling movement between the tool and blank corresponding to that of a gear rolling with a gear other than its mate whose axis intersects the blank axis and in cutting the side tooth surfaces of the other member of the pair by moving a tool in a straight path across the face of a tapered gear blank while producing a relative movement between the latter tool and blank corresponding to that of a gear meshing with a gear, other than its mate, whose axis is offset from the axis of the blank.

ERNEST WILDHABER.